United States Patent [19]

Holmstrom

[11] Patent Number: 4,592,115
[45] Date of Patent: Jun. 3, 1986

[54] APPARATUS AND PROCESS FOR SEPARATING CELLULOSE FLUFF FIBERS FROM WASTE FIBROUS MATERIAL

[75] Inventor: Sten Holmstrom, Bromma, Sweden

[73] Assignee: Mo och Domsjo AB, Ornskoldsvik, Sweden

[21] Appl. No.: 682,879

[22] Filed: Dec. 18, 1984

[51] Int. Cl.[4] ............................................. D01G 5/00
[52] U.S. Cl. ......................................... 19/82; 19/200
[58] Field of Search .................................. 19/82, 200

[56] References Cited

U.S. PATENT DOCUMENTS 1,401,795  12/1921  Kohler et al. ................... 19/82 X
3,364,526   1/1968  Várady et al. ................... 19/82

Primary Examiner—Louis K. Rimrodt

[57] ABSTRACT

Apparatus is provided for separating cellulose fluff fibers from waste fibrous material resulting from the manufacture of absorbent products from cellulose fluff fibers, comprising:

an apertured cylindrical separator disposed in a housing and having a central passage in flow connection with the inlet;

the cylindrical separator having apertures therethrough large enough to permit cellulose fluff fibers to pass therethrough but small enough to screen out larger non-fluff material from the waste fibrous material;

means in connection with the first outlet for controlling flow therethrough of air and entrained waste fibrous material, for providing a balance between flow rate and differential pressure across the apertured separator sufficient to prevent blockage of the apertrues in the separator by waste fibrous material too large to pass through while permitting cellulose fluff fibers to pass through.

5 Claims, 3 Drawing Figures

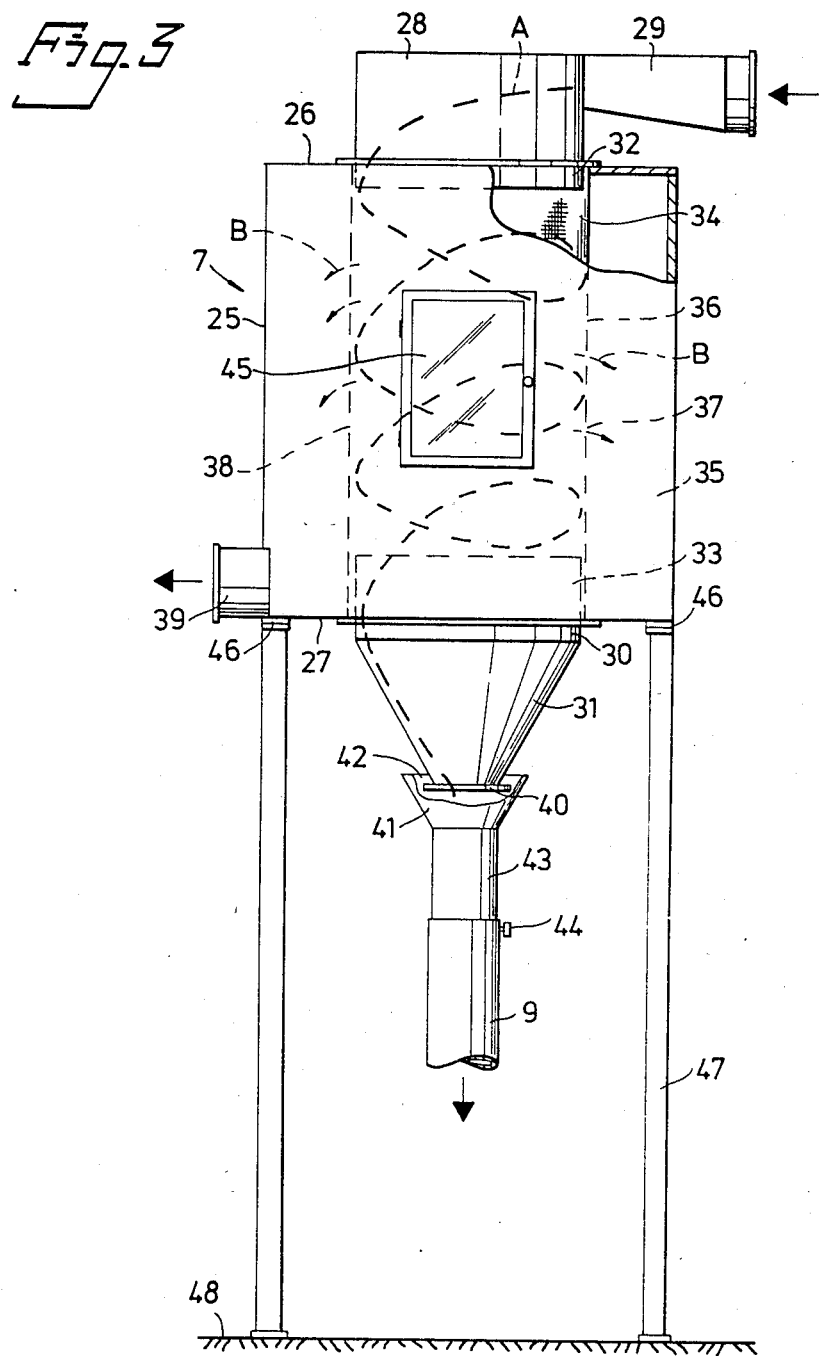

APPARATUS AND PROCESS FOR SEPARATING CELLULOSE FLUFF FIBERS FROM WASTE FIBROUS MATERIAL

Liquid absorbent products, such as diapers, sanitary towels or napkins, and underlays, comprising a liquid-absorbent pad of fluffed cellulose pulp (fluff), which is fully or partially encased in an outer layer of tissue, non-woven material and/or plastic film, are manufactured by placing a layer of fluffed cellulose pulp on a continuous web of, for example, non-woven material. A further layer comprising, for example, plastics foil is placed over the liquid absorbent pad formed by the layer of fluff. The two outer layers are then joined together along their outside edges with the aid of a binder or by some other suitable means, and the resultant endless elongated composite is separated into units of the desired length by transverse seals, which units can later on be cut off along the transverse seal.

When a machine is started up, a certain amount of fluff and layer material is necessarily wasted, as is also, for example, the tail end of the layer material on a reel which is almost empty. Under normal production conditions, a loss of about 10 to 12% as such waste can be expected. Since it has not been possible to recover this waste fibrous and sheet material for useful purposes economically, the waste material has been burned.

Such waste can represent a considerable loss, particularly in cellulose fluff fibers which are a relatively expensive component of the product, and consequently it is desirable to be able to recover at least the cellulose fluff fibers. The plastics foil or cellulose foil impregnated with plastic and glue makes it impossible, or not permissible, to mix the waste with the starting material. In addition, if a layer material is colored, it cannot be passed through a beating process, since this may result in the discoloration of other fibrous material.

Apparatus has been in use for separating cellulose fibers from foil material, by disintegrating or opening up the layer material which fully or partially encases the cellulose fibers. The apparatus includes a pneumatic conveyor for transporting processed waste to at least one separator in the form of a cylindrical housing having an upper inlet for the mixture to be separated, and a first and a second lower inlet for fibers and layer material, respectively. An apertured cylindrical separator such as a perforated drum is connected to the upper inlet and the lower outlet, and defines between its outer wall and the inner wall of the housing an annular space which is connected to the first lower outlet. Suction fans are connected to each outlet. The suction fans are arranged to act upon the material introduced to the cylindrical separator in such a manner that the waste is moved in a helical path along the inner wall of the separator, and the fibers escape through the apertures of the separator into the annular space.

Such apparatus can successfully be used for separating fine particulate material from coarse material when the particles are relatively heavy. If one tries to use such a separating apparatus to separate cellulose fluff fiber swhich are very light, from, for example, pieces or plastic foil which are also light, the pieces of plastic are drawn firmly by suction onto the inner surface of the separator. Consequently, it is not possible to use this apparatus for such a separation.

In accordance with the present invention, it has now been found that a separator of this type can be used successfully to remove cellulose fluff fibers from waste fibrous material, if there is created a selected pressure difference between the interior of the apertured cylindrical separator, such as the perforated drum, and the exterior there of with respect to the flow rate of the suspension of waste fibrous material in air, so as to ensure that the cellulose fluff fibers entrained in the air flow pass out through apertures in the separator, while the heavier particles, the pieces of plastic foil, are flowed through the separator at a speed sufficient to prevent them from being sucked over and blocking the apertures in the separator to flow of fibers therethrough.

For the purpose of providing the requisite balance between the flow rate and pressure difference between the outer and inner walls of the drum, i.e., the differential pressure across the apertured separator, the second outlet is provided with flow control means, such as a bleed valve or throttle valve controlling the size of the opening in the outlet.

The invention accordingly provides a process for separating cellulose fluff fibers from waste fibrous material resulting from the manufacture of absorbent products from cellulose fluff fibers, which comprises conveying particles of waste fibrous material including cellulose fluff fibers entrained in air as a helical flow through a passage having apertured side walls and an axial outlet of variable flow dimensions; and adjusting flow rate of the air flow through the passage with control of the axial outlet variable flow dimensions to achieve a balance between flow rate and differential pressure across the aperture through the passage side walls; whereby cellulose fluff fibers pass through the apertures and entrained waste material unable to pass through the apertures passes through the axial outlet substantially without blockage of the apertures.

In accordance with the invention, apparatus is also provided for separating cellulose fluff fibers from waste fibrous material resulting from the manufacture of absorbent products from cellulose fluff fibers, comprising:

(1) means for disintegrating the waste fibrous material into particulate form small enough to entrain in air;

(2) means for entraining particles of waste fibrous material in air;

(3) means for conveying the air with entrained particles of waste fibrous material into a cellulose fluff fiber separator;

(4) the cellulose fluff fiber separator comprising a cylindrical housing having an inlet at one end for air and entrained waste fibrous material particles;

(5) an apertured cylindrical separator disposed in the housing and having a central passage in flow connection with the inlet; and spaced from the internal wall of the housing so as to define an annular chamber therebetween;

(6) a first outlet in the housing in flow connection with the central passage of the cylindrical separator;

(7) a second outlet in the housing in flow connection with the annular chamber;

(8) the cylindrical separator having apertures therethrough large enough to permit cellulose fluff fibers to pass therethrough but small enough to screen out larger non-fluff material from the waste fibrous material;

(9) means for drawing air and entrained cellulose fluff fibers passing through the apertures from the housing through the second outlet;

(10) means for drawing air and entrained waste fibrous material not passing through the apertures from the housing through the first outlet; and

(11) means in connection with the first outlet for controlling flow therethrough of air and entrained waste fibrous material, for providing a balance between flow rate and differential pressure across the apertured separator sufficient to prevent blockage of the apertures in the separator by waste fibrous material too large to pass through while permitting cellulose fluff fibers to pass through.

Since the desired balance or ratio between flow rate and differential pressure across the cylindrical separator depends upon the concentration and composition of the entrained mixture and the dimensions of the flow passages, chambers and apertures in the separator, it is impossible to fix numerical limits upon the ratio. It is always necessary to adjust the controlling flow parameters by trial and error, until a balance between flow rate and differential pressure is established at which cellulose fluff fibers are separated and collected without blockages.

Such trial and error experimentation requires test runs at a selected flow rate, with adjustments of the amount of flow throttling at the second outlet and flow rate as well as concentration of entrained particulate and fibrous material. The run pattern varies the controlling parameters one at a time, adjusting them up or down as needed, until the desired separation is achieved.

The following description gives further details from which one skilled in the art can work out the series of experiments needed to achieve the desired result for the particular mixture to be separated in the apparatus available.

In the drawings:

FIG. 3 is a side view of the separator illustrated in FIGS. 1 and 2.

Figure 1:
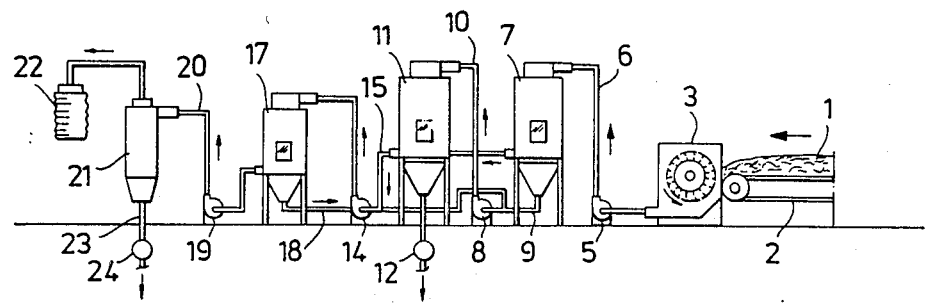
FIG. 1 is a diagrammatic side view of a cylindrical separator according to the invention.

As illustrated in FIG. 1, waste fibrous material 1 from the manufacture of absorbent products such as sanitary towels or napkins, diapers, underlays etc. is fed by means of a belt conveyor 2 to a shredder or hammer mill or comparable disintegrating apparatus 3. The composite of cellulose fluff fibers sandwiched between sheets of plastic or cellulose is disintegrated in the apparatus 3 into pieces from which the fluff fibers enclosed between the foils can be removed. For reasons which will become apparent hereinafter it is desirable to disintegrate the foil to the least possible extent, so as to enable the fluff fibers to be removed therefrom in the quickest possible manner.

In this embodiment, the apparatus is in the form of a shredder well known in the art and including a shredding wheel tearing the plastic sheet into pieces sized within a rather narrow range, which makes it possible to adjust the outlet cone 31 and funnel 4 (best seen in FIG. 3 and discussed later) so that a maximum amount of fluff can be recovered without any great risk of clogging the separator drum outlet openings.

The disintegrated, or at least opened, waste product is fed from the disintegrator 3 by means of a pneumatic conveyor, incorporating a suction fan 5 and a conveyor line 6, to the upper end of a first separator 7, which separates the pieces of foil from the fluff fibers in a first stage. The large pieces of waste foil escape at the lower end of the separator 7, and are withdrawn by means of a suction fan 8 via lines 9,10 (see in particular FIG. 2) to the upper end of a second separator 11. The pieces of waste foil and any fluff fibers adhering thereto are subjected to further separation treatment in this separator 11. The waste foil departs at the lower end of the separator 11, and is carried away by means of a pneumatic conveyor incorporating a suction fan 12. As best seen from FIG. 2, the separated fluff is discharged from the separator 7 via line 13 connected to the suction side of a suction fan 14. The fluff fibers separated in the separator 11 are fed via line 15 to the suction side of the aforesaid suction fan 14, and similarly to the fluff fibers from the separator 7, are fed via conveyor line 16 to a third separator 17. The ingoing fluff fiber material may contain minor pieces of foil, and it is for this reason that the system incorporates a third separator. Foil waste is optionally fed to the suction side of the suction fan 8 and is processed in the second separator 11 in order to remove any fluff adhering to the foil pieces, whereafter the waste foil is discharged through a line connected to the suction fan 12. The now pure cellulose fluff fibers discharged from the separator are fed via a suction fan 19 in a conveyor line to a cyclone 21, and conveying air departs via a dust filter 22. The fluff fibers are taken out, for example, through line 23 and suction fan 24, for further use.

It will be noted that the waste fibrous material in particulate form is fed into a separating drum, that the waste foil is retained within the separator drum, and discharged from the interior thereof, and that the fluff fibers are discharged through the apertures of the drum into an annular space formed between the separation drum and the cylindrical housing extending therearound.

Further details of the separator according to the invention are shown in FIG. 3. The separator illustrated in FIG. 3 is the same as the aforedescribed separator 7, as well as the additional separators, but in each the separation drums may be different.

The separator 7 as shown in FIG. 3 is provided with a vertically extending, cylindrical and at least substantially gas-tight housing 25 having an upper side 26 and a lower side 27. Arranged centrally in the upper side 26 is a circular opening 26a, to which there is sealingly connected a cylindrical, gas-tight head box 28 having an inlet 29, which is connected to the line 6 in FIGS. 1 and 2.

A circular opening 27a which is coaxial with the opening 26a and preferably equally as large is arranged in the side 27, and connected to this opening is a discharge box comprising an upper cylindrical part 30 and a conical discharge part. The opposite end parts of the cylindrical head box 28 and the cylindrical part 30 project somewhat into the housing 25 and form flanges 32 and 33, respectively. These two flanges 32 and 33 are encircled by and form supports for an open-ended cylindrical, apertured separator drum 34. The separator drum is thus connected to the inlet 29 and to the outlets 39,40. Thus, there is formed between the inner wall of the cylindrical housing 25 and the outer cylindrical surface of the separator drum 34 an annular space 35, which communicates with the interior of the separator drum 34 through apertures 36, 37 and 38.

The annular space 35 communicates with an outlet 39 for separated cellulose fluff fibers at the side 27. In the embodiment illustrated in FIGS. 1 and 2, the outlet 39 is coupled to the pneumatic conveyor line 13, and the outlet 40 from the separator drum is coupled to the line 9 (see also FIGS. 1 and 2).

As will be seen from FIG. 3, the line 9 is preferably not directly and sealingly connected to the outlet opening of the outlet cone 31, via a bleed valve. In the embodiment shown, the bleed valve takes the form of an upwardly open conical funnel 41, whose open wider end surrounds the outlet opening 40, so as to form an annular air-intake bleed valve gap 42, through which air can be drawn from the surrounding air by means of the suction fan 8. In order to enable the open area of the gap 42 to be adjusted, i.e. to alter the distance between the mutually facing wall surfaces of the cone 31 and 41, and thus control the amount of air bleed, the cone 41 of the illustrated embodiment is supported by a tube 43, which is telescopically and sealingly inserted into the tubular line 9, and held in its adjusted position by means of latching means 44.

The housing 25 is provided with an openable inspection window 45. The side 27 is provided with support shoulders or the like 46, by means of which the housing 25 can be attached to a frame 47, made of angle iron, for example, mounted on a floor surface 48.

The described separator 7 operates in the following manner. The inlet 29, to which there is supplied a stream of air entraining particulate waste material, is arranged to direct the stream of material tangentially into the head box 28, which induces a helical movement of the air stream. The stream is caused to flow towards the outlets 39 and 40 by means of the suction fans 8 and 14, and the helical flow of air-entrained waste material, which is indicated in FIG. 3 by the broken line A, is caused to move helically and downwardly along the inner wall of the separator drum 34. During helical movement of the stream A along the wall of the drum 34 towards the outlet 40, the cellulose fluff fiber, light and of small particle size, as a result of the lower air pressure prevailing in the annular space 35 will be drawn out through the apertures 36, 37, 38 in the separator drum and, as indicated by the arrows B, into the space 35, and are drawn therefrom out through the fluff outlet 39. The heavier material of larger particle size, i.e. pieces of paper, pieces of plastic foil, etc., will not be drawn out through the openings 36, 37, 38, because of their larger size. These larger pieces of waste escape through the outlet 40 and line 9. The pitch of the helical material stream A, and therewith the dwell time of the material in the separator, can be regulated within wide limits, by adjusting the width of the gap 42. When a wide gap is used, the major part of the air is drawn from the surrounding air into the line 9, and the downwardly directed component of the air stream in the separator becomes relatively weak, causing the aforesaid pitch to be small, and in extreme cases even zero, i.e. the infeed waste is not moved axially downwards, but remains stationary in the separation drum.

In order to separate the fluff fibers from the waste foil particles in the best possible manner, the pressure in the annular space 35 is regulated in relation to the pressure in the interior of the separator drum so as to ensure that the foil pieces are drawn to the apertures in the drum to the least possible extent, while maintaining at the same time the desired flow of fluff fibers through the apertures. As beforementioned, the flow of air through the outlet 40 can be controlled within wide limits, for example by means of the bleed valve 31,41, this control also implying a change in the air flow through the apertures of the separator drum, i.e. the transportation of fluff away therefrom. In certain cases, it may be suitable to control separately the flow through the outlet 39, which can be effected, for example, by changing the capacity of the suction fan 14, by arranging a throttle valve in the line 13, or by introducing ambient air, as described with reference to the outlet 40.

The separator drum 34 may comprise an open-mesh cylinder having, for example, square apertures, with opening diameters of from about 10 to about 25 mm, or may comprise, as is preferred, a metal drum, for example a stainless steel drum having extremely smooth interior surfaces, and provided with closely spaced holes. This latter type of drum offers less friction to the material stream A, and the risk of fluff fibers clinging to the apertures is very small.

The described separator can be modified in many ways without departing from the concept of the invention. For example, the bleed valve with air inlet gap 42 may be replaced with a regulator throttle valve, and this gap can, in turn, be replaced with an air inlet opening. The separators may also lie horizontally, or with their axes inclined to the vertical plane, or to the horizontal plane, respectively.

Figure 2:
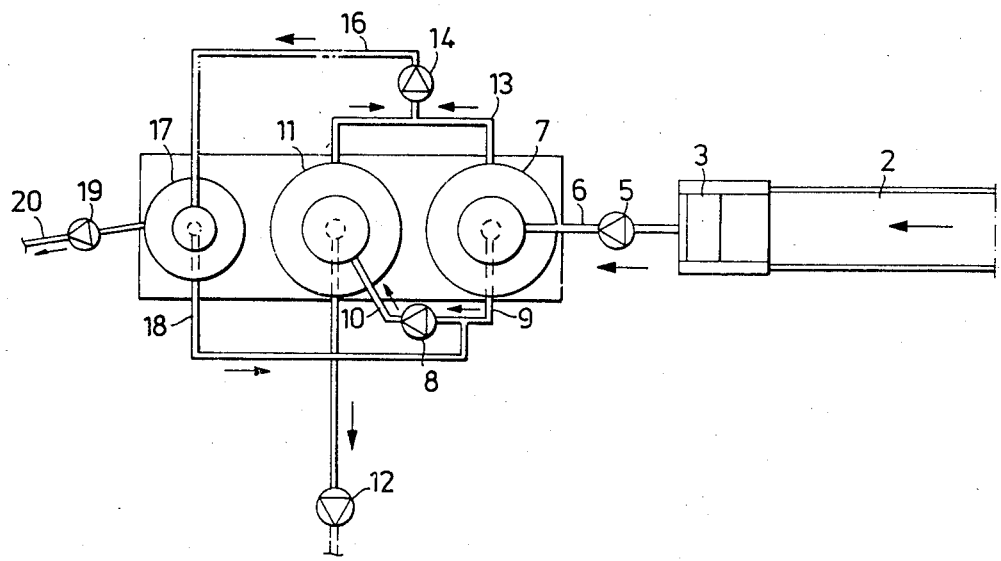
FIG. 2 is a top plan view on a larger scale of three units of the separator illustrated in FIG. 1 in connection with a waste feed system.

A particularly effective result was obtained when carrying out practical tests with a system of three in-series separators as shown in FIGS. 1 to 3, each comprising a housing 25 having a diameter of 900 mm and a height of 1000 mm and a separator drum 34 made of wire mesh having mesh sizes of 20×20 mm and an axial effective length of about 850 mm. In the third separator, the drum had a mesh size 23×12 mm.

The waste material was fed to the first separator in an air stream containing 10% by weight solid material at a speed of about 20 m/s and a volume of about 2500 m$^3$/h. The fluff fibers obtained from the first separator contained negligible quantities of foil pieces, while after the third separator a fluff material which was totally free from such foil pieces was obtained. The cellulose fluff fiber recovery was 90 to 95%, calculated on the weight of the fluff in the waste material.

In all three of these separators, the bleed valve, which served as the flow control means, had the following dimensions:
Diameter of opening =250 mm
Upper diameter of conical funnel 41 =450 mm
Lower diameter of funnel 41 and diameter of tube 43 =160 mm
Height of funnel 41 =225 mm The area of gap 42 and, thus, the inflow of ambient air is controlled by lowering and raising funnel 41. In the device shown in FIG. 3, 31 and 41 have the same conical angle, but this is not essential. When opening 40 contacts the inner wall of funnel 41, i.e. when 41 is in its uppermost position, all air is drawn through the separator, and the maximum air speed within the drum is obtained. The air speed is decreased by lowering funnel 41, and pressure difference and therefore separation can be fully controlled. If the waste contains substantially small plastic particles (low mass), the pressure difference must be relatively low, and if heavy plastic pieces dominate, the air speed can be increased.

Having regard to the foregoing disclosure the following is claimed as the inventive and patentable embodiments thereof:

1. Apparatus for separating cellulose fluff fibers from waste fibrous material resulting from the manufacture of absorbent products from cellulose fluff fibers, comprising:

(1) means for disintegrating the waste fibrous material into particulate form small enough to entrain in air;

(2) means for entraining particles of waste fibrous material in air;

(3) means for conveying the air with entrained particles of waste fibrous material into a cellulose fluff fiber separator;

(4) the cellulose fluff fiber separator comprising a cylindrical housing having an inlet at one end for air and entrained waste fibrous material particles;

(5) an apertured cylindrical separator disposed in the housing and having a central passage in flow connection with the inlet; and spaced from the internal wall of the housing so as to define an annular chamber therebetween;

(6) a first outlet in the housing in flow connection with the central passage of the cylindrical separator;

(7) a second outlet in the housing in flow connection with the annular chamber;

(8) the cylindrical separator having apertures therethrough large enough to permit cellulose fluff fibers to pass therethrough but small enough to screen out larger non-fluff material from the waste fibrous material;

(9) means for drawing air and entrained cellulose fluff fibers passing through the apertures from the housing through the second outlet;

(10) means for drawing air and entrained waste fibrous material not passing through the apertures from the housing through the first outlet; and

(11) means in connection with the first outlet for controlling flow therethrough of air and entrained waste fibrous material, for providing a balance between flow rate and differential pressure across the apertured separator sufficient to prevent blockage of the apertures in the separator by waste fibrous material too large to pass through while permitting cellulose fluff fibers to pass through.

2. Apparatus according to claim 1, in which the means for controlling flow through the first outlet is a bleed valve.

3. Apparatus according to claim 2, in which the bleed valve comprises an air intake opening in the form of a variable annular gap arranged around the first outlet.

4. A process for separating cellulose fluff fibers from waste fibrous material resulting from the manufacture of absorbent products from cellulose fluff fibers, which comprises conveying particles of waste fibrous material including cellulose fluff fibers entrained in air as a helical flow through a passage having apertured side walls and an axial outlet of variable flow dimensions; and adjusting flow rate of the air flow through the passage with control of the axial outlet variable flow dimensions to achieve a balance between flow rate and differential pressure across the apertures through the passage side walls; whereby cellulose fluff fibers pass through the apertures and entrained waste material unable to pass through the apertures passes through the axial outlet substantially without blockage of the apertures.

5. A process according to claim 4 in which the waste fibrous material comprises cellulose fluff fibers and pieces of plastic foil.

* * * * *